United States Patent Office 3,080,917
Patented Mar. 12, 1963

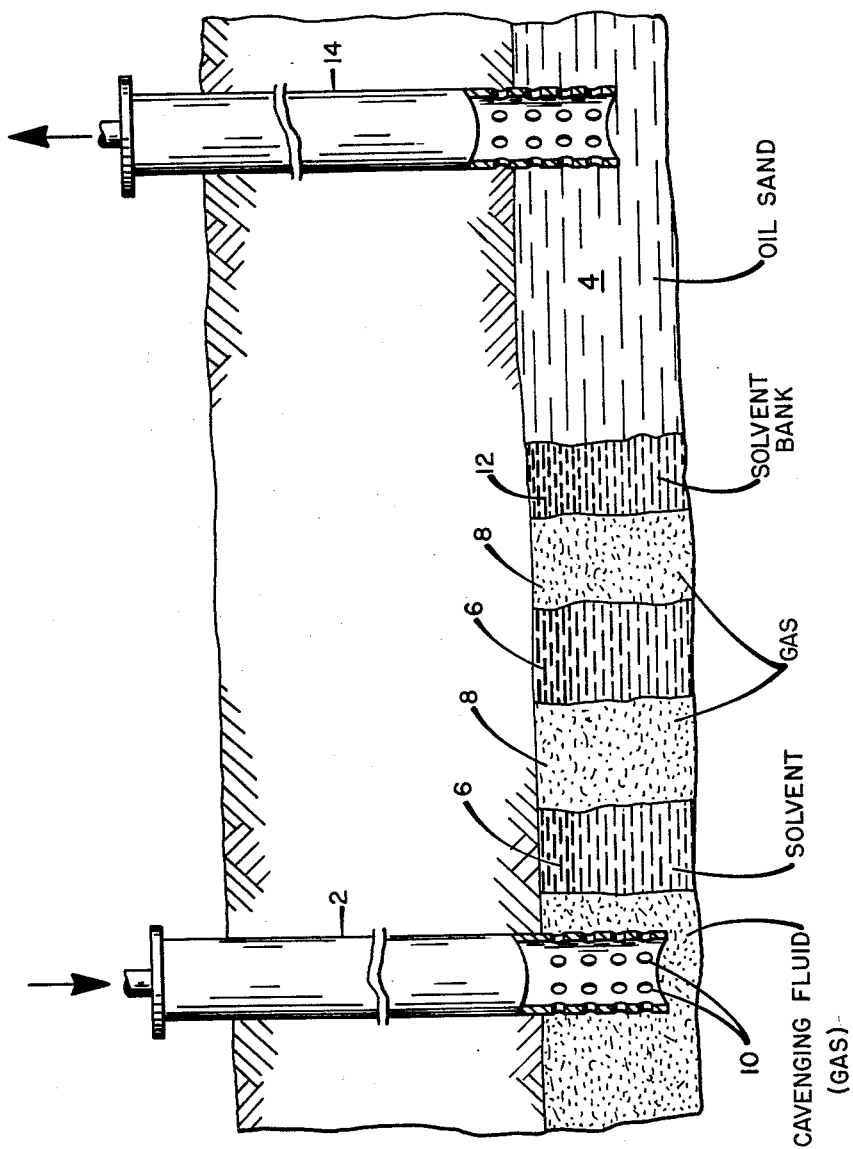

3,080,917
IMPROVED GAS DRIVE PROCESS FOR
RECOVERING OIL
Scott W. Walker, Tulsa, Okla., assignor to Pan American Petroleum Corporation, Tulsa, Okla., a corporation of Delaware
Filed July 23, 1958, Ser. No. 750,292
7 Claims. (Cl. 166—9)

This invention relates to an improved fluid drive for recovering oil from an underground reservoir. Various processes have been proposed for increasing the displacement efficiency of fluid drives for recovering oil. These involve generally the injection of an oil solvent either as a liquid slug ahead of the gas, or as a vapor or liquid dispersed in the injected gas. Gas drives of this type have been found to have an improved displacement efficiency as compared to an ordinary gas drive. That is, in the area of the reservoir contacted by the solvent, the oil recovery is substantially improved. I have found, however, that in this type of drive where adjacent fluids are mutually miscible, the low mobility ratio of each driven fluid relative to its driving fluid in the reservoir produces an undesirably low sweep efficiency and poor conformance and, therefore, that the overall oil recovery by these processes is relatively low.

It is therefore an object of this invention to provide an improved gas drive for recovering oil from an underground reservoir. It is a more specific object of this invention to provide a process for displacing oil from a reservoir more completely than has been possible with other improved gas drives. Another object of this invention is to provide a method for recovering oil from an underground reservoir by injecting a solvent therefor in multiple slugs, each of such slugs being followed by a slug of a driving fluid. Other objects of this invention will become apparent from the following description.

In brief, this invention may be described as a process for recovering oil by gas drive in which the gas drive is improved by injecting into the oil reservoir through one or more input wells, preferably ahead of the main body of the gas, alternate slugs of the oil solvent and slugs of a gas, and then displacing these alternate slugs of liquid and gas through the reservoir by injecting into the same input well or wells the main body of the gas. The oil and solvent are recovered at one or more producing wells spaced from the input well or wells.

In this process, as in the improved gas drives previously proposed, use is made of one or more input wells and one or more producing wells extending into the producing formation from which oil is to be recovered. These wells may be located either with the input wells surrounded by the producing wells or vice versa, or the input and producing wells may be located at opposite ends of the oil-producing reservoir, or a section thereof. Regardless of the well configuration, knowing the pore volume of the reservoir and the approximate amount of oil remaining in the reservoir, the hydrocarbon pore volume of the reservoir to be gas driven is desirably first calculated.

While the secondary driving fluid referred to in the description which follows is gas, it should be distinctly understood that the expression "secondary driving fluid" also is to be construed as including fluids such as, for example, water or mixtures of a gas and a liquid.

A quantity of a liquid solvent for oil is first injected into the reservoir through an input well. While I do not wish to be limited to any specified volume, preferentially, this volume is equal to between about one and about 10 percent, preferably about two percent, of the calculated hydrocarbon pore volume of the reservoir. This quantity of oil solvent is injected into the reservoir as several slugs, for example, between about two and about 100 slugs, typically about 5–10 slugs. Preferably these are of approximately equal volume. After each slug of the oil solvent is injected into an input well, a slug of gaseous driving fluid, having about the same volume at reservoir pressure and temperature as the slug of oil solvent, is injected into the reservoir through the same input well. Each of the gas slugs displaces the immediately preceding slug of oil solvent out into the reservoir and is followed by another slug of oil solvent. This alternate injection of oil solvent and gas at a pressure at which the oil solvent is a liquid in the reservoir and the displacing gas is a vapor, and at which the two are preferably immiscible at reservoir conditions, is continued until the calculated quantity of oil solvent is injected into the reservoir. After the last slug of oil solvent has been injected into the input well, it is followed by a scavenging fluid which is desirably gas. Sufficient scavenging gas is injected into the reservoir to displace most of the oil and at least part of the solvent to the producing well or wells. Most of the scavenging gas and solvent may then be recovered by closing in the injection well or wells and allowing the scavenging gas to expand and evaporate the solvent remaining in the reservoir, or otherwise displace the solvent and any remaining oil to the producing well or wells where all of these fluids are recovered.

The solvent, which is a liquid at reservoir conditions, is typically a light hydrocarbon having a mean molecular weight substantially lower than the mean molecular weight of the reservoir oil. In the preferred embodiment, this solvent is a light hydrocarbon in the $C_2$–$C_6$ range, commonly referred to as liquefied petroleum gas, and often designated L.P.G. Liquid propane and butane and mixtures thereof are the most common solvents employed.

The gas in the alternate or secondary driving fluid slugs and in the scavenging phase which displaces the slugs through the reservoir is desirably partially soluble in the solvent at reservoir conditions. However, this gas and the solvent are preferably immiscible at reservoir conditions. That is, the two are displaced through the reservoir below the critical pressure of the solvent-gas system at reservoir temperature, so that they are maintained in two phases, a gas and a liquid phase, within the reservoir. Where the solvent is a light hydrocarbon or mixtures thereof, as described above, the gas is also desirably a hydrocarbon mixture having a lower average molecular weight than the solvent. Natural gas or methane is preferred. The preferred gas may, however, be combined with other gases such as carbon dioxide, nitrogen, flue gas, and the like.

The phenomenon which causes this process to increase oil recovery as compared to other improved gas drives is not too well understood, but it is theorized that the increased oil recovery is due to a very high sweep efficiency. That is, in previously proposed improved gas drives, the capillary forces between the various fluids have been reduced to such an extent that the injected fluids all tend to channel from the input well under, over, or through the oil reservoir directly to the producing well, while in the present process the advantages of the other improved gas drives have been retained and their main disadvantage, channeling, has been minimized. It is well known that the displacement pressure of two phases through a reservoir is greater than the displacement pressure of a single phase. It is, therefore, reasoned that with displacement of multiple slugs of solvent and a compatible gas at a pressure below the critical pressure of their mixtures, any tendency for an area or even a single capillary to take fluid at a more rapid rate than the surrounding areas or capillaries causes that area or capillary to be partially blocked sooner than the others by encroachment of the second phase. This causes the displacing fluid to be diverted to other areas or channels of lesser initial permeability so that the sweep efficiency, both vertical and areal, is substantially increased.

The process of my invention may be further illustrated by reference to the accompanying drawing wherein an oil solvent is first injected via well 2 into oil stratum 4 to form a solvent bank 12. Following this injection of solvent, alternate slugs of natural gas 8 and L.P.G. 6, substantially equal in volume, are injected into the formation via well perforations 10. The aforesaid slugs serve as the moving force to push solvent bank 12 through the oil sand and, in total volume, amount to from about 1 to about 10 percent of the hydrocarbon pore volume. Under the temperature and pressure conditions of the reservoir, solvent bank 12 is maintained as liquid. Introduction of a scavenging fluid, typically natural gas, via perforations 10, into the formation serves to force slugs of solvent 6 and gas 8 therethrough which, in turn, push the oil in stratum 4 toward producing well 14. In this way gravity segregation is in large part minimized since the gas and solvent both seek different channels and levels consistent with their characteristics and, hence, the drift toward a bypassing of the solvent around the oil bank is materially reduced.

It should be pointed out that the present drawing is merely for purposes of illustration and although it diagrammatically demonstrates a logical result of the process steps as described herein, I do not wish to be bound by any particular theory as to the mechanism of such process. Thus, while the slugs of solvent 6 and gas 8 have been shown to exist in the formation as components of similar size, such is only diagrammatic and the true position and shape of these slugs may or may not assume those illustrated.

A particular advantage of this process arises if a mixing zone, e.g., that between the oil and solvent, does not stabilize or become of constant volume during passage of a slug through the reservoir. In that case, this technique is advantageous in that each slug drives its associated oil as long as the slug exists, and the solution effects will, accordingly, be less for each successive slug. The mixed solvents can, of course, be recovered by conventional means, such as by fractionation of the produced fluids.

I claim:

1. A process for recovering oil from an underground reservoir having at least one input well and at least one producing well comprising injecting into said reservoir through an input well a multiplicity of slugs of a light hydrocarbon liquid having an average molecular weight substantially less than the average molecular weight of said oil, the total volume of all of said multiplicity of slugs of a light hydrocarbon liquid being between about one and about 10 percent of the hydrocarbon pore volume of said reservoir, injecting into said reservoir through said input well a slug of a hydrocarbon gas between slugs of said light hydrocarbon liquid, the total volume of all slugs of said hydrocarbon gas being about equal to the total volume of all of said multiplicity of slugs of a light hydrocarbon liquid, and injecting a quantity of a scavenging gas into said input well to displace said slugs through said reservoir towards at least one producing well.

2. A process according to claim 1 wherein said hydrocarbon gas and said light hydrocarbon liquid are at a pressure in the reservoir below the critical pressure of a mixture of said hydrocarbon gas and said light hydrocarbon liquid.

3. A process according to claim 2 wherein the total quantity of said light hydrocarbon liquid is about two percent of the hydrocarbon pore volume of said reservoir.

4. A process according to claim 3 wherein said quantity of said light hydrocarbon is divided into between about two and about 100 slugs.

5. A process according to claim 4 wherein each of said slugs of light hydrocarbon liquid and the slug of said hydrocarbon gas therebetween are all of substantially equal volume in said reservoir.

6. A process for recovering oil from an underground reservoir comprising injecting into said reservoir a quantity of liquefied petroleum gas having a volume in said reservoir of between about one and about 10 percent of the hydrocarbon pore volume of said reservoir, said liquefied petroleum gas being divided into between about two and about 100 slugs of substantially equal volume, injecting into said reservoir alternately with each of said slugs of liquefied petroleum gas a slug of natural gas, the volume of each slug of said natural gas in said reservoir being substantially equal to the volume of each of said slugs of liquefied petroleum gas, the pressure of said reservoir being less than the critical pressure of the mixture of said liquefied petroleum gas and said natural gas, and finally injecting into said reservoir behind the last of said slugs of liquefied petroleum gas a quantity of said natural gas sufficient to displace at least part of said slugs of liquefied petroleum gas through said reservoir.

7. A process according to claim 6 wherein said natural gas is injected into said reservoir at a pressure below the single phase pressure of said liquefied petroleum gas and said natural gas.

References Cited in the file of this patent

UNITED STATES PATENTS

| | | |
|---|---|---|
| 2,347,769 | Crites | May 2, 1944 |
| 2,822,872 | Rzasa et al. | Feb. 11, 1958 |
| 2,897,894 | Draper | Aug. 4, 1959 |
| 2,927,637 | Draper | Mar. 8, 1960 |
| 2,968,350 | Slobod | Jan. 17, 1961 |

FOREIGN PATENTS

| | | |
|---|---|---|
| 696,524 | Great Britain | Sept. 2, 1953 |